United States Patent [19]

Davies

[11] Patent Number: 4,679,236
[45] Date of Patent: Jul. 7, 1987

[54] IDENTIFICATION VERIFICATION METHOD AND SYSTEM

[76] Inventor: Richard E. Davies, 2031 Brooks Dr., Forestville, Md. 20747

[21] Appl. No.: 684,918

[22] Filed: Dec. 21, 1984

[51] Int. Cl.$^4$ .......................... H04L 9/00; G06K 5/00
[52] U.S. Cl. ......................................... 380/23; 380/25; 380/28; 380/44; 235/380; 235/382
[58] Field of Search ............... 178/22.08, 22.09, 22.16, 178/22.11; 235/379, 380, 381, 382

[56] References Cited

U.S. PATENT DOCUMENTS

| | | | |
|---|---|---|---|
| 4,259,720 | 3/1981 | Campbell | 178/22.08 |
| 4,281,215 | 7/1981 | Alalla | 178/22.08 |
| 4,302,810 | 11/1981 | Bouricius et al. | 178/22.16 |
| 4,453,074 | 6/1984 | Weinstein | 178/22.11 |
| 4,471,216 | 9/1984 | Herve | 235/380 |

Primary Examiner—Salvatore Cangialosi
Assistant Examiner—Aaron J. Lewis
Attorney, Agent, or Firm—Lowe, Price, Leblanc, Becker & Shur

[57] ABSTRACT

A secure system provides identification verification by transmission of an access number, preferably a random number, from a central processor to a remote terminal. The system provides portable identification devices for use by individuals, programmed to perform specified mathematical functions on data input thereto. The user obtains the access number from a remote terminal, and provides selected digits therefrom as input to the portable device. The result of the mathematical function performed on the selected digits is transmitted to the host processor for comparison with a similar result obtained by performing the mathematical function associated with the identified user on a selected subset of digits of the access number selected in accordance with a selection pattern associated with the user. As a further step for securing operation of the system, only selected digits of the results may be provided for comparison.

21 Claims, 6 Drawing Figures

IDENTIFICATION VERIFICATION METHOD AND SYSTEM

FIELD OF INVENTION

This invention relates to identification devices, and more specifically to electronically operated encryption apparatus used for identifying the identity of an individual seeking access to a secure operation, such as a data base, a financial transaction, a communication network, or the like.

BACKGROUND ART

Recent technology provides for implementation of identity verification with the aid of programmed computing devices. The ability of such computing devices to communicate with one another over large distances permits access to a number of secure facilities to be monitored and controlled by a central controller.

Typically, a user carries an identification apparatus for interacting with a remote terminal in communicating contact with a central controller. To assure that the user presenting the identification apparatus is, in fact, the authorized individual, a secret code, such as a personel identification number (PIN), known only to the authorized user, is required to be input to the remote terminal for transmission to the central controller for verification of user identity. Alternatively, the appropriate PIN is encoded on the identification apparatus in a manner not readily visible or detectable by a user, and the remote terminal is provided with sufficient decoding intelligence to provide a comparison between the code input by the user and the code associated with the identification apparatus.

Such prior art approaches suffer from a lack in security engendered by the ability of unscrupulous or unauthorized personnel to intercept telecommunication between the remote terminal and the central controller, thus providing a possibility of unathorized access to a PIN associated with a specific identification apparatus. Alternatively, such unscrupulous persons may decode a number physically associated with the identification apparatus and may thus present such a number along with the unauthorized apparatus to gain access to a secure system.

The prior art thus suffers from deficiencies in security operations which may result in erroneous identification and access to the secured system. One prior art approach to resolution of the above-mentioned problem is the generation of a random number by the central controller for transmission to the remote terminal in encrypted form. The remote terminal, upon receipt of the random number generated by the central controller, decrypts the number and in turn re-encrypts the same for re-transmission to the central controller. Such an approach is described in prior U.S. Pat. No. 4,349,695. However, the generation of random numbers for transmission from the central controller for ultimate re-transmission thereto does not solve the difficulties previously identified with respect to such systems.

DISCLOSURE OF INVENTION

It is accordingly an object of the present invention to overcome the difficulties of the prior art and to provide a secure apparatus for identity verification and for authorization of access to secure facilities.

It is a more specific object of the invention to provide a method and apparatus for permitting an authorized user to access a secure facility with the aid of a portable identification apparatus programmed to perform a predetermined function on an access number, preferrably a random number, whether transmitted by a central controller to a remote terminal or generated at the remote terminal or the portable identification apparatus.

It is yet another object of the invention to provide method and apparatus for enabling an authorized user to access a secure facility by selection of an arbitrary, ordered, subset of digits of an access number transmitted by the central controller to the remote terminal for input to a programmed identification apparatus for computation of a predetermined arithmetic function thereon and for re-transmission to the central controller of a subset of the resultant function of the subset for comparison with the results of performance by the central controller of the predetermined function on the appropriate subset of digits of the random number and the result.

It is an additional object of the invention to provide increased security for an identification verification apparatus by utilization of a system approach which, even if intercepted by unauthorized personnel, cannot provide sufficient information to determine the approach.

Still another object of the invention is the provision of a portable identification apparatus, usable as a calculator, which may be activated to an identification mode by provision of an activation code and which, once active, performs a predetermined mathematical function on data input thereto. More specifically, the data is input in the form of a subset of digits of a random number generated by a remote central controller.

Yet another object of the invention is the transmission of a selected subset of digits of a calculated function of the random number to a central controller for comparison with the proper subset of digits of a similar result of application by the controller of a predetermined mathematical function to a subset of digits of a random number.

It is another object of the invention to provide a portable, pre-programmed, apparatus capable of obtaining mathematical functions of random numbers input thereto for identification of a user of a communication authorization card for access to a telecommunications network.

Another object of the invention is the provision of method and apparatus for access to a secure system wherein a portable authorization apparatus generates for display to the user a random number, the user selecting a subset of digits of the random number for input to the authorization apparatus which is pre-programmed to perform a specified mathematical function thereon and to provide a result thereof to the user.

In accordance with these and other objects of the invention, there is provided a method of verifying the identity of a user including the steps of providing a user-identifying number to the system and, in turn, providing a response number to the user. The system operates by maintaining therein first and second tables, representative of sets of digit subsets corresponding to specified user numbers and to arithmetic functions corresponding to the user numbers respectively. The user selected portion of the response number is input to a calculating apparatus of the system which calculates a first result as a function thereof. A subset of digits of the response number is selected by the system, the subset corresponding to a subset identified in the first table with the user identifying number. Similarly, arithmetic function is selected by the system from the second table, in accordance with the user number, and applied to the previously selected portion of the response number to obtain a second result. The first and second results are compared and the user identity is verified upon equality of the result in order to permit user access to the apparatus controlled by the system.

Preferably, the step of providing a response to the user includes the provision of a random number to the user, and the provision of the user number to the system includes the step of inputting such a number to a portable, user-carried remote component of the system.

The random number may be generated either by the host central control unit, by a remote terminal communicating with the host, or by the portable user carried unit. The portion of the random number selected by the user for input to the system is preferably input to the portable component of the system which is preprogrammed to perform a single predetermined function on the input portions of the random numbers provided by the user. The portable component may, in the alternative, be programmed to perform one of a number of functions on the random number portions in accordance with a user number.

Further, in accordance with the invention only a portion of the result of the arithmetic function provided by the remote unit is selected by the user for input to the system. The system is operable for selecting a portion of the result of application of the arithmetic function selected from the second table for comparison with the portion of the result function input by the user in order to provide the output signal confirming the user's identity only upon determining equality of the compared portions. Selection of the system-generated result may be undertaken in accordance with the portion of the response number, determined by the user identifying number according to the first table. Alternatively, there may be provided a third table in which the result portions to be selected for comparison are provided in accordance with the individual user identifying number independently of the entries in the first table.

In accordance with another aspect of the invention there is provided an apparatus for authorizing access to a secure facility having a host processor including a random number generator and a plurality of remote access units. The inventive improvement in such an apparatus includes a circuit within each of the remote units for performing a unique or a selected mathematical function on data input thereto to obtain a first result. The host processor includes a selecting means for selecting specified digits of the random number and for selecting a specified mathematical function to perform on the selected digits, thus to obtain a second result, in accordance with a specified user. Further the system incorporates a receiver for the first and second results and a comparator to compare the results and to provide a control signal for activating a secure facility only upon the determination of a match of the two results.

Preferably, the comparator includes a second selector to select a specified subset of digits included in the second result for the comparison, in order further to limit authorization of access to the secured facility only to users capable of selecting both a predetermined subset of the random number and a predetermined subset of the result digits.

Other objects, features and advantages of the present invention will become readily apparent to those skilled in the art from the following description wherein there is shown and described a preferred embodiment of the invention, simply by way of illustration and not of limitation of one of the best modes (and alternative embodiments) suited to carry out the invention. As will be realized upon examination of the specification and from practice of the same, the preset invention is capable of still other, different, embodiments and its several details are capable of modifications in various obvious aspects, all without departing from the invention. Accordingly, the drawings and the descriptions provided herein are to be regarded as illustrative in nature and not as restrictive of the invention.

BRIEF DESCRIPTION OF DRAWINGS

The accompanying drawings, incorporated in and forming a part of the specification, illustrate several aspects of the present invention and, together with the description, serve the principle of the invention.

BEST MODE FOR CARRYING OUT THE INVENTION

Figures 1, 2, 3:
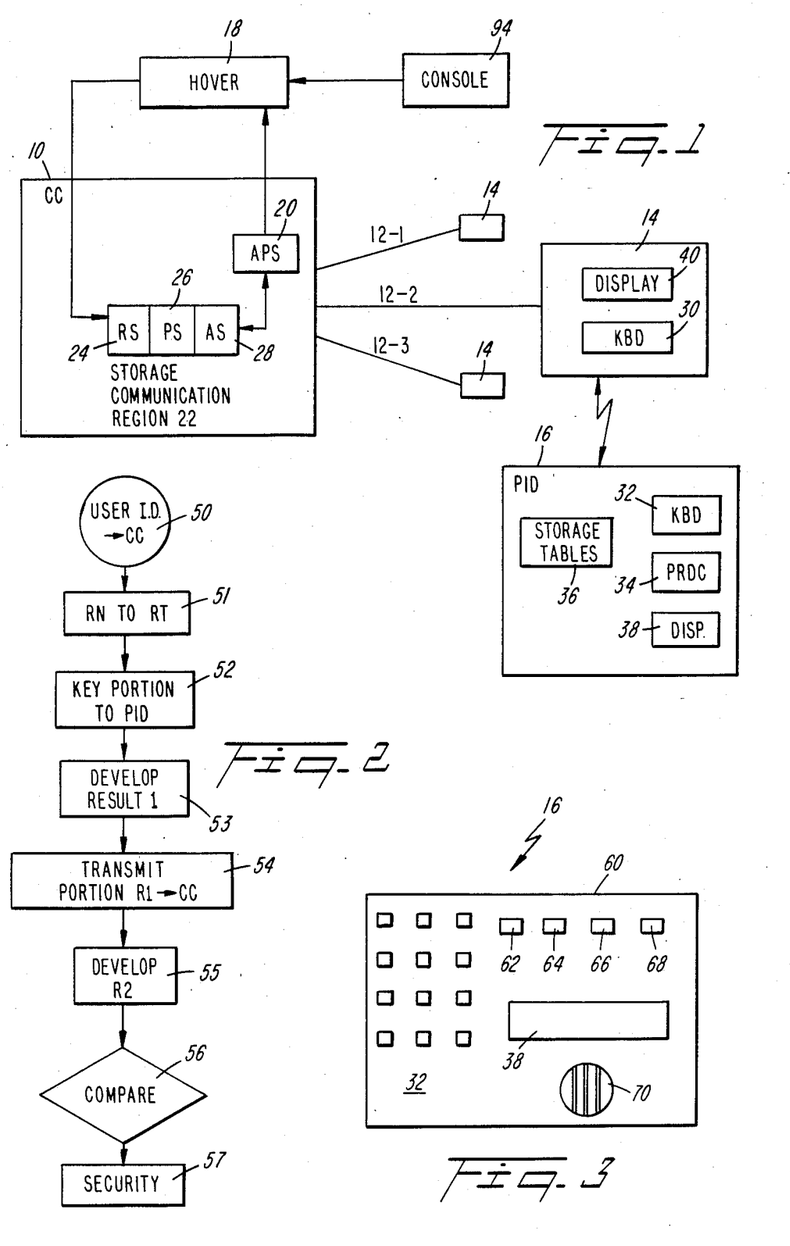
FIG. 1 represents a schematic illustration of a system for carrying out the present invention.
FIG. 2 illustrates operation of the system via a flow chart.
FIG. 3 shows a portable identification device for use in the system shown in FIG. 1.

As is appreciated from the preceeding summary of the invention, a system and method is provided for identifying an individual to permit access to a secured facility, to a financial transaction, to a telecommunications network, to a computation facility or the like. Referring specifically to FIG. 1 there is shown a complete system for carrying out the invention.

At a central location there is provided a central control unit, or host processor 10. The host processor communicates over lines 12-1, 12-2, . . . 12-3 with various remote terminals (RT) 14. The remote terminals 14 are located at various facilities and, as is known in the art, may receive input messages from a user desiring access to the facility, may display responses to such messages, and may further provide signals to activate relays or to enable electronic circuits for permitting the user access to the desired facility. Such remote terminals may, for example, be associated with automatic teller machines, used in financial institutions, with door locking and unlocking devices associated with operations having various levels of secrecy, with software system access controllers, with telephone access systems, etc. Each of these, and other, applications is hereinafter encompassed within a term referring to a "secured facility".

The various remote terminals 14 communicate over lines 12 with the central host processor. The host processor, in accordance with typical applications, includes programmed processing units for confirming the identify of a user attempting to access a secured facility via various input information provided to the remote terminal associated therewith. The remote terminal transmits such information to the host processor for evaluation. In accordance with the present invention, a user is provided with a portable identification device (PID) 16.

The user desiring access to a secured facility informs a remote terminal of a user identifying number, the remote terminal communicating the user ID number to the host processor. Unlike the prior art, such communication between the remote terminal and the host processor may be in an unencrypted format, since the specific identification of a user involves functions performed by the PID 16 and the host processor 10 on common data, and on a comparison of the results achieved by both units. Host processor 10 has associated therewith a host verifying (HOVER) unit 18 for performing various identification functions.

The host processor itself may include, however, a stored operational program to enable a processing unit included therein to perform the functions of security access approval associated with HOVER 18. The processor further includes access permitting software (APS) 20 resident therein and communicating with the HOVER. In an embodiment in which the HOVER is implemented, by software, the HOVER and APS may, in fact, be a single software program. Whether a separate unit 18 or resident software is utilized to perform the identification functions, communication between the HOVER and APS, and thus with the other functions performed by the host processor, is achieved via a storage area dedicated thereto. Thus, host processor 10 includes a storage facility identified as a communications region (CR) 22 including three separate sections.

A requesting section 24, a pending section 26, and an answer section 28 are provided within communication region 22. As will be seen in the following description, the identifying component associated with the central control unit, whether a separate HOVER or software combined with the APS, includes storage tables identifying specific user numbers with digit subsets and with particular mathematical functions. A significant aspect of the invention is the performance of specified mathematical functions associated with a particular user on a specified subset of digits of an access number provided both to the identifier component in the host processor and to the PID 16. The results of the mathematical functions performed on the subset of digits of an access number may be freely, transmitted from the remote terminal 14 to the central control unit 10 for comparison to determine whether the proper function was performed on the proper subset of digits, thus identifying an individual accessing the system via a keyboard 30, or other input means associated with the remote terminal, as as authorized user having access to an authorized PID.

In that regard, PID 16 preferably includes its own input keyboard 32, or other input device, providing data to a processor 34. Storage tables 36 are associated with the processor in PID 16. A display, or other output device, is similarly provided in the PID to provide to the user an indication of the output of processor 34. A display 40, or other output apparatus, is similarly provided in RT 14.

Having described the various elements of the system, operation of the same is described in connection with FIG. 2, which illustrates operation of the system via a flow chart.

Referring now to FIG. 2, step 50 identifies initiation of the system in which a user activates a PID and further provides a user identification number to the central control unit. The user ID number may be provided by keyboard 30 of remote terminal 14, or may alternatively be provided to the remote terminal via keyboard of PID 16 and via a communications link between PID 16 and remote terminal 14. At any rate, the user ID number is transmitted to the host processor which, upon receipt thereof, activates HOVER 18.

It should be noted that PID 16 preferably is embodied in a housing resembling a standard hand-held calculator, and is activated to operate in conjunction with the identification system by inputting of a specified code thereto. A particular pushbutton may be provided to indicate to the processor 34 that activation of the PID is desired. Having thus activated the portable identification device, and having provided a user ID number to the host processor for initiation of system operation therein, both units proceed to perform a mathematical function on a subset of digits of an access number. Thus, a user inputting an appropriate user identification number to the remote terminal will be provided with a response access number and will be required to provide to the system a result of a mathematical function performed on a subset of digits of the access number. Any unscrupulous persons who may illicitly observe an authorized user inputting a user number and thereafter inputting a response to an access number would not be able to obtain identification verification since different access numbers are provided by the system for each identification.

The access numbers may be random numbers or may be predetermined numbers generated in accordance with a table or formula. Further, the access numbers may be generated by any one of the three units, host processor 10, remote terminal 14, or portable identification device 16. Preferably, the access number is a random number generated by host processor 10 and transmitted to remote terminal 14 for output to the user. Such output may be by way of display 40 by way of the communication link between remote terminal 14 and PID 16.

Independently of the source of the random number, the number is available both to processor 34 of PID 16 and to HOVER 18. Where generated by the host processor, the random number is transmitted to remote terminal 14 at step 51 of the flow chart of FIG. 2. While the number may be output on display 40, as previously described PID 16 may generate the random number and communicate the same to RT 14 and thence to host processor 10. At this point, the user, upon observing the random number on display 38 of PID 16 or on display 40 of RT 14, is required to key in a specified subset of digits of the random number to the processor 34 via KBD 32 of PID 16. For example, the access number may be a twelve digit random number, and six of the digits thereof are required to be input to processor 34 as an argument of a mathematical function. At step 52 the user thus keys a portion of the random number to the processor 34 of PID 16. At step 53 processor 34 performs a specified mathematical function on the digits keyed in by the user at step 52.

Each PID may have a single mathematical function preprogrammed for the processor, or may have a number of such programs to permit use of a single portable identification device by a number of authorized users. Accordingly, storage table 36 in the PID may be used to store a number of such mathematical functions in accordance with specified user identification numbers. Alternatively, the particular mathematical function associated with individual users may be encoded in chips carried by the users, the chips being replacably pluggably connected to the PID.

At step 53 the processor thus performs the function to develop a first result. This result is provided to the user on display 38.

At step 54 the result provided by processor 34 is transmitted to the host processor, which at step 55 generates a second result for comparison with the first result at step 56. Upon favorable comparison, a further check may be performed at step 57 to assure security of the HOVER prior to permitting the user access to the secured facility.

In order further to enhance security of the system, transmission of the first result to the host processor in step 54 may require the user to key only a portion of the first result to remote terminal 14. This portion may be selected as a subset of digits of the result, and the subset may be identical with the subset utilized at step 52 or may be selected as a different subset of digits. Thus, any unscrupulous person who may tap one of the communication lines 12 will be unable to determine the appropriate response by a particular user to a random number without having access both to the functions performed by the PID of that user and to the digit subsets required to be input by the user. Even if such unscrupulous person were to obtain a user number and to obtain the legitimate PID associated with that user number, without knowing the subset of digits of the random number required to be input to the PID and the second subset of digits of the result to be input to the remote terminal, such persons would be unable to activate the identification system of the invention.

Referring now to FIG. 3, a portable identification device in accordance with the invention is illustrated as including keyboard 32 together with display 38 in a housing 60.

In addition to the keyboard 32, additional specified function keys may be provided as shown at 62, 64, 66 and 68. Key 62 is provided to input a signal to the PID processor 34 requesting activation of the identification function of the apparatus. It is noted that prior to activation of the device for identification purposes, keyboard 32 may be utilized to input numerical data to the processor for standard numerical computations in the form of a portable calculator. Additionally, the processor may be used for string processing, as required in a word processing environment, with keyboard 32 appropriately modified for inputting literal, alphabet strings. In that regard, display 38 may be provided sufficiently large to display output messages associated with the word processing environment.

Thus, the device shown in FIG. 3 may be utilized as a portable computer until activation of key 62 to initiate operation of the identification function in conjunction with the system of FIG. 1. A separate level of identification may be required in conjunction with activation of the device as an identification apparatus, such as by requiring input of a particular user number or other identifying information. However, in view of the inventive method, wherein a user must select a subset of digits displayed either on Display 40 or Display 38 for inputs to the processor in order to obtain proper identification, the PID is preferably activated immediately by key 62. The remaining function keys, as well as a speaker 70, or other acoustic output, are usable in conjunction with obtaining access to a telecommunication network via a telephone instrument, as described in the sequel. In that regard, key 64 may be provided to activate a multi-frequency tone generating device included in the PID, key 66 may be provided to cause PID 16 to generate an access code for accessing the telephone system, and for causing the PID to output the access code on speaker 70, and key 68 may be provided for activation of a telephone application of the inventive system.

Figure 4:
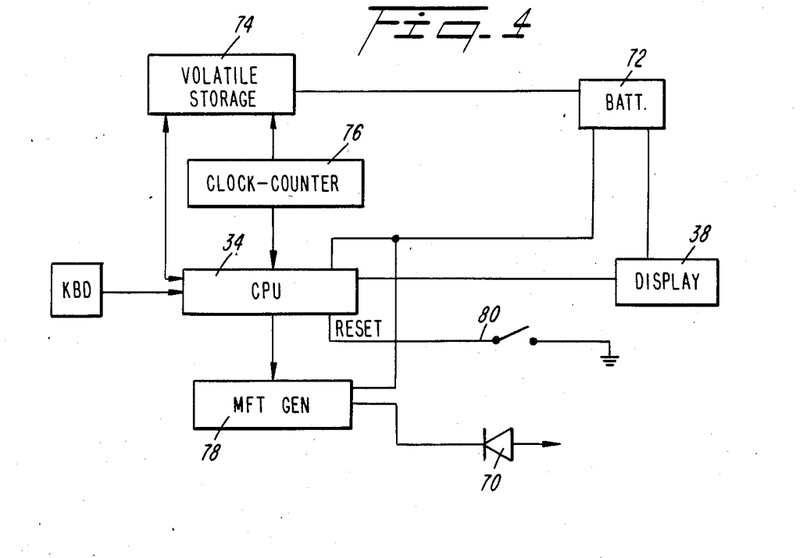
FIG. 4 shows in block diagram form the interconnection of the components of the device of FIG. 3.

Referring now to FIG. 4, the internal structure of PID 16 is illustrated as including an interconnection between a battery 72, a volatile storage 74, a clock and counter 76 utilized to provide further security to the system, programmed processor 34 and display 38, and internal multifrequency tone generator 78 is connected to the CPU to provide output tones to speaker 70 for telephone applications. Preferably, the device is provided with a cover to obscure the display 38 from unauthorized personnel and to permit a user discreetly to input information via keyboard 32. A switch 80 is provided for activation by the cover to reset processor 34. Further, the interconnection between battery 72 and the various components of the device is provided as an intergral part of housing 60 so that any attempt to break into PID 16 to access storage 74 will result in opening the power supply circuit, thereby erasing the contents of volatile storage 74. Cover actuated switch 80 may be used as a means of turning the device on and off. Storage 74 includes therein the tables 36 of the PID for storage of the several mathematical functions which may be associated with the unit, as well as for storage of the operating program for processor 34. Clock and counter unit 76 provides still a further security feature for the PID to prevent unauthorized use as well as to provide a time display as requested by the user. Thus, reactivation of the PID is preferably limited to a predetermined number of attempts within a prescribed time period. Thus, upon receiving repeated activation signals within a two-minute time period, for example, counted by clock 76, CPU 34 in accordance with a program stored in storage 74 will not perform the various identification functions. Further, the counting aspect of the clock and counter device 76 is preferably utilized to count the number of erroneous attempts to activate device 16 for identification procedures. In this regard, CPU 34, in accordance with further programming in storage 74, requires a specific activation code to be input via keyboard 32 in order to operate device 16 in an identification mode. Key 62 is utilized to differentiate such a code from a numerical or alphabetic input string provided to the processor for computation or other processing. Finally, clock 76 may be used to count specified time periods, such as monthly or semi-annual periods, within which a user must receive further authorization to utilize the system. The PID is thus disabled upon termination of such a time period, pending re-authorization and appropriate re-activation of the function by supervisory or service personnel.

For operation in conjunction with a telephone system, storage 74 includes a program for processor 34 whereby input of a telephone number associated with activation of key 68 causes generation of a random number for display and storage. The appropriate portion of the random number is, in turn, keyed by the user and the CPU proceeds to perform the appropriate mathematical function in order to obtain the first result in the system. The appropriate portion of the first result is then keyed by the user on the remote terminal which, in telephone applications, may be a standard telephone keyboard. Alternatively, the user may input the appropriate portions of the first result via keyboard 32 for encoding as a number of multi-frequency tones by generator 78 to be output on speaker 70. The device is placed for acoustic-coupling between speaker 70 and the mouthpiece of the telephone unit in order to transmit the random number as well as the appropriate portions of the first result to the host processor.

Since various long distance telephone carriers may be accessed from some telephone units while other units may be exclusively connected to a single long distance carrier, it may or may not be necessary to generate an access code. Such an access code, which may be used to provide a further level of security, may not be required where it is assumed that mere availability of the telephone unit to the user implies authorization to access the telephone system. Accordingly, key 66 is provided for activation by the user in a situation where the access code is required. In such a situation, activation of key 66 causes generation of the access code for output on speaker 70 which is acoustically coupled to the telephone mouthpiece.

Thus, having computed the first result, PID 16 is acoustically coupled to the telephone mouthpiece and, upon activation of key 64, data including the complete random number, user identification, first result for the appropriate subset of digits thereof and the phone number to be dialed are communicated to the host processor. Upon receiving the various data, host processor 10 operates to verify that the appropriate subsets of digits were selected and that the appropriate functions have been performed on the digit subsets. A positive response leads to authorization of access to the telephone system.

Figure 5:
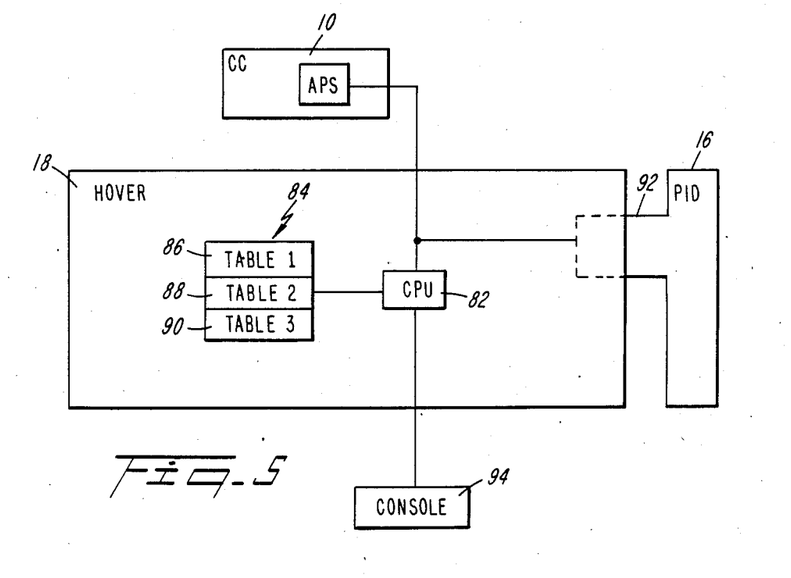
FIG. 5 illustrates a host verifying component of the system in FIG. 1.

Referring now to FIG. 5, there is illustrated an interconnection among components comprising the host verifier 18 of the system in FIG. 1. Where the host verifier 18 is a separate hardware component accessing the host processor via a separate channel, the verifier may include a separate processor 82 and a storage 84 including therein a number of tables. A first table 86 stores digit subsets associated with specific users, in accordance with user identification numbers. Thus, upon receiving a user identification number, the table 86 is accessed to determine the appropriate subset of digits from a random number upon which a mathematical function is to operate. A second table 88 stores specific mathematical functions associated with specific user identification numbers. Thus, having generated a random number for transmission to the remote terminal or, alternatively, having received from the remote terminal a random number generated by the PID, HOVER 18 selects the appropriate subsets of digits in accordance with the user ID number and the contents of table 86 and performs thereon a mathematical function stored in table 88 similarly selected in accordance with the user ID numbers. Finally, the appropriate subset of result digits is obtained in accordance with the contents of table 90, similarly corresponding to the user identification number. The subset of result digits is then compared to the subset of result digits of the PID operation as transmitted by the user from the remote terminal. The HOVER 18 thus determines approval or denial of the requested access and transmits the same to the host processor for appropriate re-transmission to the remote terminal.

To assure further security at the host processor and at the HOVER, the device is preferably programmed not to accept any information from the host processor other than an interrupt request, thus assuring inaccessibility of the stored data therein to unauthorized individuals. Moreover, the various functions performed by the HOVER 18 are logged in a sequential log and available for subsequent audit.

Figure 6:
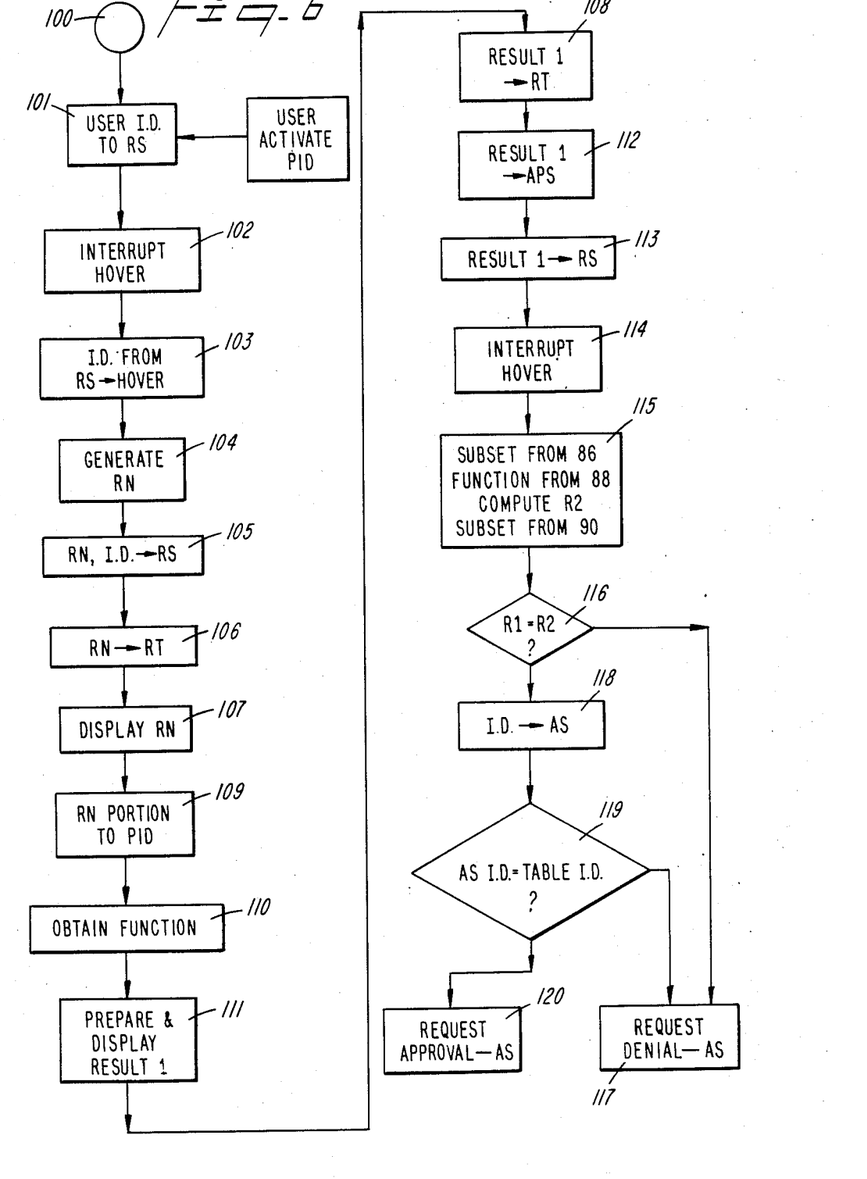
FIG. 6 shows a detailed flow chart illustrating operation of the system.

Still another security aspect is provided for communication between the HOVER 18 and APS 20. During such communication, HOVER 18 repeatedly checks, at each step, whether information conveyed to and stored by APS 20 agrees with the original information stored in the HOVER storage 84. Any attempt to modify the information stored in the host processor is thus detected by the HOVER and further access thereto is denied. This facet of the invention is apparent upon reference to FIG. 6, showing a flow chart for the interactions between HOVER 18 and the APS software 20 resident in the host processor 10.

Initially, at step 100 the HOVER is initiated upon receipt of an access request from remote terminal 14 to the host processor 10. Such a request activates a communication channel between the remote terminal and the host processor, and is further used to activate the HOVER in connection with the specific request. In connection with the request, a user transmits a user identification number to the host processor at step 101. The APS stores the user ID number in the request section 24 of storage 22 and, at step 102, generates an interrupt request to initiate the verification process of HOVER 18. At step 103 HOVER 18 reads the user ID number from request section 24 and recognizes the request for identification verification. The user ID number is retained by the HOVER in a separate section of memory 84 (not shown). At step 104 a random number is generated by the processor 82 of HOVER 18 and at step 105 the random number, together with the user identification number, are placed in the pending section 26 of storage 22. APS 20 accesses the random number and causes host processor 10 to transmit the same to remote terminal 14 at step 106. At step 107 the remote terminal displays the random number and receives, at step 108, the appropriate subset of result digits representing the result of the computation by the PID. Intermediate steps 107 and 108 the user, at step 109, selects a subset of digits for input to the PID. At step 110 the appropriate mathematical function associated with the particular user is obtained from storage, and the function is applied at step 111 to the digits input at step 109. The result is provided on display 38 to the user who, in turn, selects the appropriate subset for input to the remote terminal at step 108. Terminal 14, at step 112, transmits the digits input in step 108 to the APS.

At step 113 the APS stores the result received from the remote terminal in the request section 24 of storage 22. A further interrupt to verify the reply is generated at step 114 and provided to HOVER 18. Responsive to the interrupt, HOVER 18 provides the second result at step 115. This step includes the substeps of initially obtaining a first subset of digits associated with the user from table 86, obtaining the appropriate function from table 88, applying the function to the subset of digits to compute a result, and selecting a subset of result digits in accordance with an entry in table 90.

The two sets of result digits are compared at step 116. An inequality of the two subsets leads to performance of step 117 wherein a signal indicating denial of the request is placed by the HOVER in answer section 28 of storage 22. The further steps securing communication between the HOVER and APS are illustrated at steps 118 and 119. Therein the user identification number or other data is placed in the storage 22, preferably in the answer section thereof. Upon a positive response to the comparison of step 116, before generation of a request approval the HOVER carries out step 119 in which the coded information previously placed in answer section 28 is compared with the user identification number internally stored by the HOVER. A failure of the comparison indicates that the storage in the host processor has been improperly changed, resulting in performance of step 117, specifically providing to the host processor a signal indicative of request denial. If, however, the comparison of step 119 is positive, indicating that the storage of the host processor has not been improperly changed, HOVER 18 issues a signal approval of the request for access to the secured facility and, at step 120, stores the approval signal in the answer section of storage 22. Since each of the verifying steps is performed within the HOVER 18, and since the device is operable to receive no information other than interrupt requests, security of the system operation is assured since any attempt to modify signals transmitted by the HOVER 18 results in denial of access.

With the exception of initiation of the system, information cannot be written into the HOVER 18 but may only be read out therefrom. In that regard, the various PID 16 units are each uniquely programmed by the HOVER 18 in an initialization procedure. Thus, as shown at FIG. 5, HOVER 18 includes a male plug 92 for insertion into a recepticle in PID 16. In an initialization procedure a security manager at the HOVER site utilizes a special access code, input via console 94, for example, to gain entry to the HOVER 18 processes. During initialization, the security manager inputs to the HOVER 18 data correlating serial numbers of various PID 16 units with user ID numbers. The HOVER 18 stores the information in a user table and develops specific mathematical functions for use by the HOVER 18 and the specified PID 16 in conjunction with requests from the identified user. During such an initialization procedure, the PID 16 housing cover preferably remains closed and sealed. Thus, the security manager will be unaware of the digit subsets or the mathematical functions provided to the PID 16 of any given user. The PID 16 is further programmed, upon first opening of the cover and first activation of cover switch 80, to display the specified digit subsets and activating codes to the user. Additionally, a coded duress signal for the particular PID 16 will be displayed to the user. The PID 16 is further programmed to terminate the display upon closure of the housing cover and appropriate activation of switch 80, and no further display of the same is permitted. Thus, once a user memorizes the information displayed at initial opening of the PID 16 the information is no longer displayed or available to any individual.

The following description provides an illustration of the specific mathematical functions which may be utilized and the selection process for the digit associated with the results thereof. The mathematical functions may be developed by the HOVER 18 for each PID 16 and may be identified by a nine entry sequence. In the information sequence which is provided by the HOVER 18 to the PID 16, the first entry indicates a mathematical addition or multiplication function to be performed on the random number. Specifically, a digit sequence may be provided for addition to or multiplication of the random number, the digit sequence forming the second entry in the nine entry identification of the mathematical function. The third entry identifies an addition or multiplication operation to be performed on the results of the operation of the first entry. The addition or multiplication is to be performed on a further sequence of digits provided as a fourth entry in the sequence.

An offset number is provided as a fifth entry in the sequence describing the mathematical function, the offset number to be added to the result of the third entry performed on the digits in the fourth entry. Preferably the offset number may be a power of ten. Two further functions of addition or multiplication are indicated in the sixth and eighth entries, and the digits to be added to or multiplied by the random number in accordance with the functions of the sixth and eighth entries are provided as the seventh and ninth entries in the description of the mathematical function. Finally, to assure that each PID 16 provides a unique response to a random number, the serial number of the PID 16 is added to the above result.

The foregoing nine-entry sequence thus identifies one entry in table 88 of HOVER 18, and identifies a corresponding entry in the storage table 36 of PID 16. The HOVER 18 is further programmed to assure that each PID 16 includes a unique set of functional descriptive entries, by varying the entries identifying the function to be performed and by varying the digit sequences of the second, fourth, fifth, seventh and nine entries in the sequence. Storage table 86 includes a selection algorithm for selection of specified digits for specified user ID numbers, and the user presumably memorizes the same subset of digits to apply to the PID 16 for performance of the mathematical function thereon.

The inventive system further includes a breach and detection and protection aspect, in which a particular signal pattern is provided to modify the previously described results obtained by the PID 16. A duress signal may be generated in the HOVER 18 in response to receipt of an appropriately modified result. Thus, the user of each PID 16 may be required to provide one or the other of the units or tens digits of the PID 16 result. A duress signal may be provided to the HOVER 18 by transmission of the alternate digit. Thus, the function stored in the PID 16 and in the HOVER 18 will require a comparison of the units and tens digits of the result of the nine sequence operation. If the two are the same, a one will be added to the tens digit. Yet another security feature is provided in order to detect attempts to breach system integrity. Detection of such a breach is associated with two of the digit positions selected for transmission to the host processor. When an erroneous identification code is input by keyboard 32 to the PID in an attempt to activate the system, an invalid attempt is detected. Rather than shutting down operation, the system may be programmed as follows. Two of the result positions may be required to have a sum in the units position which differs from a predetermined number. Upon occurrence of the predetermined number as the sum of the two digits, a breach of security is detected as having occurred. Thus, upon provision of an invalid user identification number or access code, the PID 16 may be programmed to provide the result with two digits having a sum equal to the predetermined number. On the other hand, upon performance of a proper identification verification procedure, the left mode of the two selected positions will be incremented by one if the result in fact equals the breach detecting predetermined number.

A sample illustration of the type of function performed in accordance with the invention and of the appropriate selection of digits for transmission to the host processor is illustrated.

| SAMPLE OPERATION | |
|---|---|
| Program | Progressive Result |
| Receive random number | 000000719265 |
| Multiply by 5 | 000003596325 |
| Add 49278537 | 000052874862 |
| Multiply random # by 100 and add | 000124801362 |
| Add 37215943 | 000162017305 |
| Multiply by 7 | 001134121135 |
| Add serial number 3217852186 | 004351973321 |
| Duress positions unequal? Yes. | |
| No change. | |
| Invalid reply scheme E plus J equal 8? | |
| Yes: add 1 (one) to E. | 004361973321 |
| Positions | ABCDEFGHIJKL |
| Send CDEIJL | 436    33  1 |

There has thus been described and illustrated a method and apparatus for identity verification by providing an electronic programmed security system incorporating a portable remote unit, in which password control is eliminated and identification is assured for credit, telephone access, computer access and other purposes. The system includes duress signalling and generation of an erroneous appearance of success under security breach conditions. The individual user is the only person capable of using the PID 16, and the system enables reliance on a third party for transmission of the unencrypted information without breaching security. Thus, the identified individual may control the PID 16 and may communicate the numbers to be transmitted from a remote terminal to a host processor by a third party. The third party, however, cannot utilize the knowledge obtained during such a transaction since the replies are uniquely generated each time an access is desired.

Advantageously, the present invention requires no unique hardware at any of the remote terminals and instead provides a programmed identity verification unit at the host processor.

The foregoing description of the preferred embodiment of the invention has been presented for purposes of illustration and description, and is not intended to be exhaustive or to limit the invention to the precise forms disclosed, since many obvious modifications and variations are possible in the light of the above teaching. The embodiment was chosen and described in order best to explain the principles of the invention and its practical application, thereby to enable others skilled in the art best to utilize the invention in various embodiments and with various modifications as are suited to the particular use contemplated. It is intended that the scope of the invention be defined by the claims appended hereto, when interpreted in accordance with the full breadth to which they are fairly and legally entitled.

I claim:

1. A method of verifying identity of a user of a secure system comprising the steps of:
   providing a user identifying number to the system;
   providing a response number to a user;
   maintaining in the system a first table of different number portions corresponding to each individual user identifying numbers;
   maintaining in the system a second table of arithmetic functions corresponding to individual user identifying numbers;
   inputting a user-selected portion of said response number to calculating apparatus of the system;
   calculating a first result as a function of said user-selected portion of said response number;
   selecting from said first table a number portion corresponding to the user-identifying number provided to the system;
   selecting from said response number a portion corresponding to the number portion selected from said first table;
   selecting from said second table an arithmetic function corresponding to the user-identifying number provided to the system;
   operating on said selected portion of said response number with said arithmetic function selected from said second table to obtain a second result;
   comparing said first and second results;
   providing an output signal confirming verification of the identity of the user only if said first and second results are equal; and
   activating apparatus controlled by the system to permit user access thereto only in response to said output signal.

2. The identity verification system of claim 1 wherein said step of providing a response number comprises the step of providing a random number to the user.

3. The identity verification system of claim 2 wherein said step of providing the user identifying number to the system comprises the further step of inputting said identifying number to a portable, user-carried, component of said system remote from a host computer of said system.

4. The identity verification system of claim 3 wherein said step of providing said response number comprises the step of generating said random number in the host computer of said system.

5. The identity verification system of claim 2 wherein said step of inputting a user-selected portion of the random number comprises the further step of inputting said portion to a portable, user-carried, component of said system remote from a host computer of said system.

6. The identity verification system of claim 2 wherein said step of inputting a user-selected portion of the random number comprises the further step of inputting said portion to a portable, user-carried, component of said system preprogrammed to perform a single, predetermined function on the input portions of the random number input thereto by the user, said user-carried component being remote from said host computer.

7. The identity verification system of claim 6 comprising the further step of activating said portable component by inputting an activation code thereto, said portable component programmed for responding to input of a proper activation code by accepting the user selected number to perform the predetermined function thereon.

8. The identity verification system of claim 2 comprising the further steps of
   inputting a user-selected portion of said first result to the system, and
   selecting a portion of said second result for comparison with said user-selected portion of said first result, and
   wherein said step of comparing said first and second results comprises the step of comparing said user-selected portion of said first result with said selected portion of said second result to provide said output signal only if said portions of said first and second results are equal.

9. The identity verification system of claim 8 wherein said step of selecting a portion of said second result for comparison with said user selected portion comprises the step of selecting said portion of said second result in accordance with the number portion corresponding to the user identifying number in said first table.

10. The identity verification system of claim 8 comprising the further step of maintaining in the system a third table of result portions corresponding to individual user identifying numbers and wherein said step of selecting a portion of said second result for comparison with said user-selected portion comprises the step of selecting said portion of said second result in accordance with an entry in said third table.

11. The identity verification system of claim 2 wherein said system comprises a host computer and a portable, user-carried, remote component, and
wherein said step of providing said response number comprises the step of generating said random number in the portable component of the system.

12. In a limited access identification verification apparatus for authorizing access to a secure facility including
a plurality of remote access means and a host processing means having access number generating means, the improvement comprising:
means within each of said remote access means for performing a mathematical function on data input thereto to obtain a first result,
selecting means within said host processing means for selecting for each user a different subset of digits of a random number generated by said generating means, said subset being less than the whole random number, and for selecting and performing a specified mathematical function in accordance with a specified user on the selected digits of said random number to obtain a second result;
means for receiving said first and second results from said remote access means and from said selecting means; and
means for comparing said received first and second results and for providing a control signal to activate said secure facility only if said first and second results match one another, thereby authorizing access thereto only if a user successfully provides a proper user identification corresponding to a specific remote access means and if the user further selects a proper subset of digits of said random number, corresponding to said user identification, for input to said specific remote access means.

13. A limited access identification verification apparatus as recited in claim 12 wherein said means for comparing further comprises second selecting means for a specified subset of digits of said second result for said comparison, thereby further limiting authorization of access to said secured facility only to a user further selecting a proper subset of digits of said first result for provision to said comparing means.

14. A limited access identification verification apparatus as recited in claim 12 wherein said remote access means includes portable identification means programmed for performing said mathematical function on data input thereto.

15. A limited access identification verification apparatus as recited in claim 14 wherein said portable identification means includes storage for storing a plurality of mathematical functions and selecting means for selecting a specified one of said functions in accordance with a user specifying number input thereto.

16. A limited access identification verification apparatus as recited in claim 15 wherein said access number generating means includes random number generating means for providing said access numbers to the user as random numbers.

17. A limited access identification verification apparatus as recited in claim 15 wherein said storage means comprises interchangeable chip means pluggable into receiving means on said portable identification means for permitting different users to use a single portable identification means to select different subsets of digits of the access number and to perform different mathematical functions thereon.

18. In a limited access identification verification apparatus for authorizing access to a secure facility including
a plurality of remote access means and a host processing means, the improvement wherein said remote access means includes portable identification means programmed for performing said mathematical function on data input thereto and access number generating means,
means within each of said remote access means for performing a mathematical function on portions of the access number input thereto by the user to obtain a first result,
selecting means within said host processing means for selecting, for each user, a different subset of digits of a number generated by said generating means, said subset being less than the whole number, and for selecting and performing a specified mathematical function in accordance with a specified user on the selected digits of said number to obtain a second result;
means for receiving said first and second results from said remote access means and from said selecting means; and
means for comparing said received first and second results and for providing a control signal to activate said secure facility only if said first and second results match one another thereby authorizing access thereto only if a user successfully provides a proper user identification corresponding to a specific remote access means and if the user further selects a proper subset of digits of said number, corresponding to said user identification, for input to said specific remote access means.

19. A limited access identification verification apparatus for authorizing access to a secure facility as claimed in claim 18 further including a communication apparatus accessing a telecommunications network, said telecommunications network connecting said portable identification means to said host processing means, said means for comparing including means for providing access for said communication apparatus to said telecommunications network,
said portable identification means including first storage means for storing an identification number of a receiving terminal to be accessed by said communication apparatus via said telecommunication network, and second storage means for storing said access number,
signalling means for signalling said host processing means via said telecommunications network, and means for activating said signalling means to transmit to said host the identification number of said receiving terminal, the access number generated by said generating means, the portions of the access number input by the user and portions of the first result input to said portable identification means by the user.

20. A limited access identification verification apparatus for authorizing access to a secure facility as described in claim 19 wherein said means for activating is further operable for activating said signalling means to transmit to said host an access code identifying the user.

21. A limited access identification verification apparatus for authorizing access to a secure facility as described in claim 19 wherein said signalling means comprises multifrequency tone signalling means and acoustic coupling means for coupling multifrequency tones generated thereby to said communication apparatus.

* * * * *